United States Patent [19]

Ressel et al.

[11] 3,781,975

[45] Jan. 1, 1974

[54] METHOD OF MANUFACTURING DIODES

[75] Inventors: Franz Ressel; Andreas Ritter, both of Heilbronn, Germany

[73] Assignee: Licentia Patent-Verwaltungs-G.m.b.H., Frankfurt, Germany

[22] Filed: June 24, 1971

[21] Appl. No.: 156,242

[30] Foreign Application Priority Data

June 24, 1970 Germany .................. P 20 31 071.8

[52] U.S. Cl. ........................ 29/583, 29/580, 29/590, 117/93.1

[51] Int. Cl. .............................................. B01j 17/00

[58] Field of Search ............................. 29/580, 583; 204/164; 117/93.1 GD

[56] References Cited

UNITED STATES PATENTS

| | | | |
|---|---|---|---|
| 2,930,107 | 3/1960 | Martin | 29/583 |
| 3,432,919 | 3/1969 | Rosvold | 29/580 |
| 3,485,666 | 12/1969 | Sterling et al. | 117/93.1 GD |
| 3,591,477 | 7/1971 | Pomerantz | 204/164 |
| 3,624,677 | 11/1971 | Pearson | 29/583 |

*Primary Examiner*—Richard J. Herbst
*Assistant Examiner*—Wibur C. Tupman
*Attorney*—Spencer & Kaye

[57] ABSTRACT

A method of manufacturing diodes comprises mounting, by one side, a semiconductor disc metallised on both sides on a carrier, and mounting a thin cover on the other side of the semiconductor disc, dividing the disc into a plurality of parts, forming an insulating coating on the divided parts, thereafter removing the insulating coating and the thin cover from the metallised surface of the disc parts and finally detaching the disc parts from the carrier.

10 Claims, 5 Drawing Figures

Inventor:
Franz Ressel
Andreas Ritter
BY Spencer & Kaye
ATTORNEYS.

Inventor:
Franz Ressel
Andreas Ritter
BY Spencer & Kaye
ATTORNEYS.

METHOD OF MANUFACTURING DIODES

BACKGROUND OF THE INVENTION

The invention relates to a method for manufacturing diodes with side surfaces protected by insulating material and produced in large numbers from a semiconductor disc or plate, metallised on both sides, by dividing the dics, wherein the semiconductor disc or plate is mounted with one surface on a carrier body, prior to the cutting.

It is known to cover semiconductor bodies, the two large, mutually facing surfaces of which are provided with metal coatings, on their unprotected side surfaces with an insulating layer in order to prevent impurities in the environment from reaching the sensitive semiconductor element. Such passivating layers may consist, for example, of silicon dioxide or silicon nitride.

A passivating layer of $SiO_2$ may be mounted on the exposed areas of the semiconductor surface, for example, by thermal oxidation, if the semiconductor body is made of silicon. It is also known to apply oxide layers to the semiconductor surface by evaporation at about 600° C.

The drawbacks of the known methods are caused by the high temperatures involved. During the application of the oxidation or evaporation temperature, the electrical characteristics of the semiconductor elements frequently change in an undesirable manner.

SUMMARY OF THE INVENTION

It is an object of the invention to simplify, the present known manufacturing methods and to avoid the above mentioned disadvantage during passivation of the semiconductor surface.

According to the invention, there is provided a method of manufacturing diodes comprising the steps of metallising both main surfaces of a semiconductor disc or plate, mounting said semiconductor disc or plate on a carrier by one of said main surfaces, mounting a thin cover on the other of said main surfaces, dividing said semiconductor disc or plate into a plurality of parts by forming valleys therein extending to said carrier, applying an insulating coating to said plurality of parts of said disc, removing said insulating coating together with said thin cover from said metallised surface of said disc or plate on which said thin cover was mounted, and detaching said plurality of parts of said disc or plate from said carrier.

BRIEF DESCRIPTION OF THE DRAWINGS

The invention will now be described in greater detail, by way of example, with reference to the drawings, in which.

DESCRIPTION OF THE PREFERRED EMBODIMENT

Basically it is proposed in a method of the type hereinbefore described that the other surface side of the semiconductor disc or plate is provided with a thin cover; that the cover is divided together with the semiconductor disc or plate along lines intersecting along lines arranged in cross-like configuration; that then an insulating coating is applied to the parts of the disc or plate by evaporation at low temperatures; and that finally the insulating coating is removed from the metallised surface of the diode elements together with the residual parts of the cover, and the diodes are separated from the carrier.

According to the method of the invention, the insulating layer is preferably applied to the semiconductor elements by dusting or sputtering. Sputtering is the application of the insulating layer by dusting in a high-frequency glow-discharge field at temperatures, which are preferably below 60° C. For sputtering, the elements to be coated are placed in a receptacle which contains an inert gas and the pressure within which is, for example, of the order of $10^{-6}$ torr. The cathode, placed in the receptacle, is provided with a plate of the insulating material to be vapourised e.g. a quartz plate. The semiconductor discs or plates to be coated are preferably mounted on the anode. Since the surface of the cathode is much smaller than that of the anode, a large dark field forms over the cathode when the high-frequency voltage is applied and a large part of the peak voltage declines. The gas ions in this region are therefore strongly accelerated and knock insulating material molecules out of the quartz plate which are deposited on the semiconductor elements. In order to prevent strong heating, the cathode is cooled.

Hence, the method in accordance with the invention is carried out at temperature which are so low that a temperature conditioned modification of the electrical values of the diode elements is impossible.

The method according to the invention and its further preferred embodiments will now be described, by way of example, with reference to the accompanying drawings.

Figure 1:
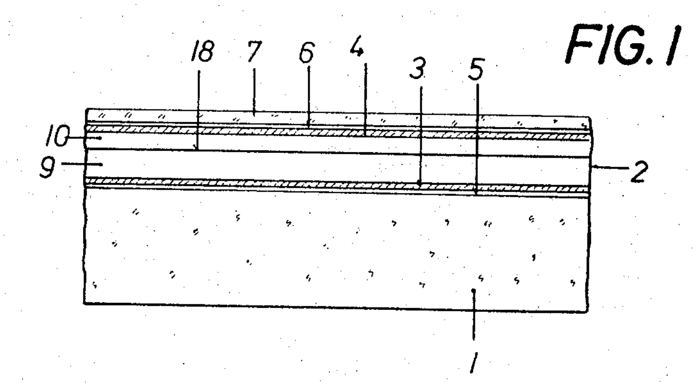
FIG. 1 is a cross sectional view of a semiconductor disc or plate forming a first stage of a method in accordance with the invention.

FIG. 1 shows in cross-section a carrier 1, made preferably of glass. The semiconductor disc or plate 2, coated on both sides with gold or other metal coatings 3 and 4 is glued by means of an adhesive 5 to the glass carrier 1. The semiconductor disc or plate 2 contains two zones 9 and 10 of opposite conductivity, separated by a p-n transition 18. By means of an adhesive 6 a thin layer 7, preferably a thin glass plate, is glued to the metal coating 4 of the exposed semiconductor surface. This glass plate may have a thickness of, for example, about 100$\mu$ m.

Figure 2:
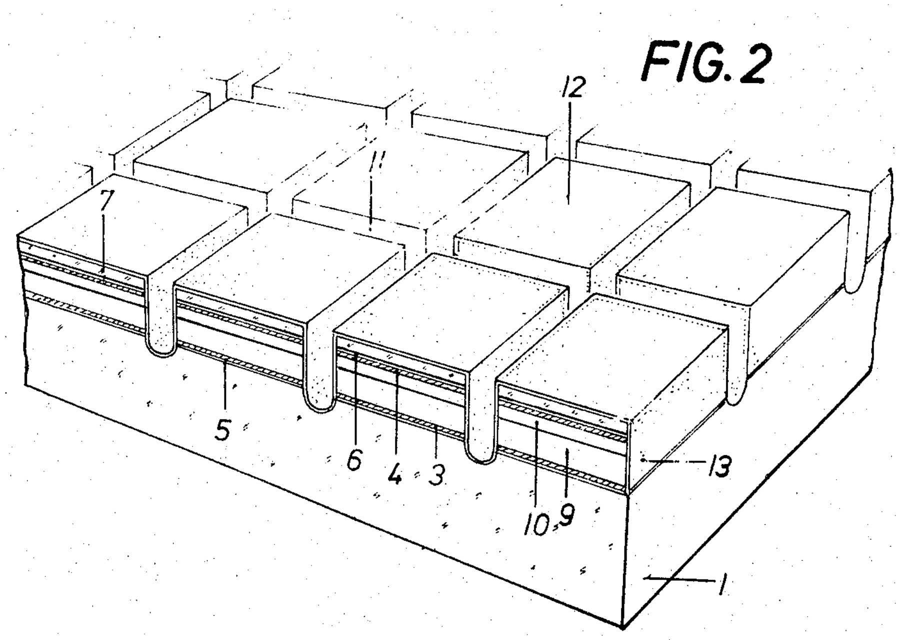
FIG. 2 is a part perspective view of the semiconductor disc or plate in a further stage.

The thin glass plate 7 is divided together with the semiconductor disc or plate 2 by cutting same, e.g. by sawing or ultrasonic drilling, along lines intersecting in cross-like configuration. In this manner, valleys 11 are formed between the individual diode elements 12, extending into the carrier plate 1. This arrangement is shown in FIG. 2 partly in cross-section and partly in perspective. The insulating coating 13 covering the side walls of the semiconductor bodies in the valleys 11 is produced in a sputtering installation as described above. Obviously, the insulating coating is also deposited on the other parts of the thin glass plate 7.

Figure 3:
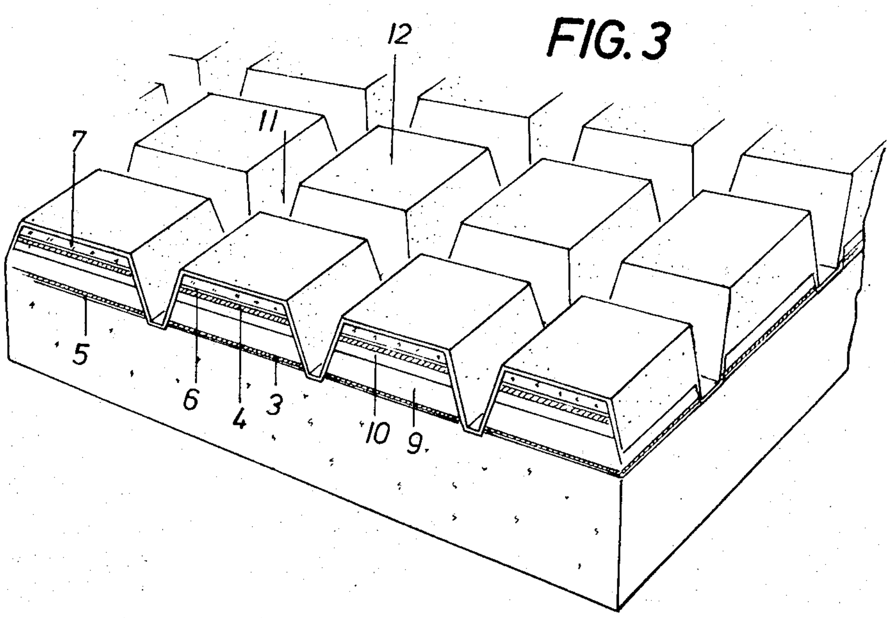
FIG. 3 is a part perspective view similar to FIG. 2 but showing an alternative further stage.

Whilst FIG. 2 shows diode elements 12 with straight sawed walls, FIG. 3 shows mesa-shaped elements, also in perspective. The valleys 11, which taper towards the bottom, are made by means of a suitably formed saw blade.

By means of a suitable solvent, the carrier 1 and the remaining parts of the thin glass plate 7 are detached from the semiconductor elements. During the removal of the remaining parts of the glass plate 7, the parts of the passivating layer 13 located on the portion of the plate 7 are simultaneously removed. A suitable solvent for glass adhesives is, for example, dimethyl formamide.

Figure 4A:
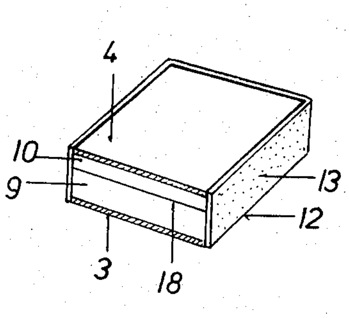
FIG. 4*a* is a perspective view of a diode produced using the method stage of FIG. 2.
Figure 4B:
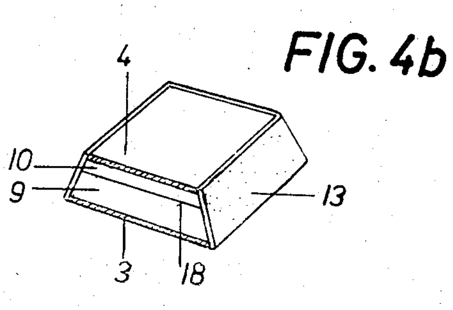
FIG. 4*b* is a perspective view of a diode produced using the method stage of FIG. 3.

FIGS. 4*a* and 4*b* show the individual semiconductor elements. FIG. 4*a* shows a diode element with vertical side walls which are all covered with a passivating layer 13, for example, of silicon dioxide or silicon nitride. The opposite main surfaces of the element are free from the passivating material and are covered with the metal coatings 3 and 4 which are connected with other connecting elements for contacting the element.

In FIG. 4*b*, the corresponding diode element is shown in mesa-structure. Also here, all side walls are covered with the passivating layer 13.

Finally, it should also be mentioned that the coating for the semiconductor disc may also be a plastic which is resistant to acids and solvents.

It will be understood that the above description of the present invention is susceptible to various modifications, changes and adaptations.

We claim:

1. A method of manufacturing diodes, whose side surfaces are protected by insulating material, in large numbers from a semiconductor disc or plate comprising the steps of: completely metallizing both main surfaces of the semiconductor disc or plate; mounting said semiconductor disc or plate on a carrier by one of said metallized main surfaces; covering the other of said metallized main surfaces with a thin glass plate; dividing said thin glass plate and said semiconductor disc or plate into a plurality of parts by cutting valleys, which extend to said carrier, in said semiconductor disc; applying an insulating coating to said plurality of parts of said disc and said thin glass plate; thereafter removing said insulating coating together with the remaining portions of said thin glass plate from said other metallized surface of said disc or plate and detaching said plurality of parts of said disc or plate from said carrier.

2. A method as defined in claim 1, wherein said insulating coating is applied by evaporation at low temperature.

3. A method as defined in claim 2, wherein said valleys between said parts of said semiconductor disc or plate intersect at right angles.

4. A method as defined in claim 3, wherein a carrier plate of glass is used as said carrier.

5. A method as defined in claim 4, wherein said carrier plate of glass and said thin glass plate are secured to said semiconductor disc or plate by adhesives.

6. A method as defined in claim 3, wherein said insulating coating is applied by dusting the semiconductor parts in a high frequency glow discharge field.

7. A method as defined in claim 6, wherein an insulating coating of silicon dioxide is used.

8. A method as defined in claim 6, wherein an insulating coating of silicon nitride is used.

9. A method as defined in claim 4, wherein said semiconductor disc or plate is divided by sawing.

10. A method as defined in claim 4, wherein said semiconductor disc or plate is divided by ultrasonic drilling.

* * * * *